United States Patent [19]

Nugues et al.

[11] Patent Number: 5,341,853
[45] Date of Patent: Aug. 30, 1994

[54] METHOD FOR DESTROYING AEROSOL CANS

[76] Inventors: Francois Nugues, 11 Rue du Hainaut, Andresy, France, 78570; Pierre H. Robic, 7 Rue de Boussois, Epinay sur Seine,, France, 93800

[21] Appl. No.: 601,826
[22] PCT Filed: Mar. 6, 1990
[86] PCT No.: PCT/FR90/00150
§ 371 Date: Sep. 29, 1992
§ 102(e) Date: Sep. 29, 1992
[87] PCT Pub. No.: WO90/10507
PCT Pub. Date: Sep. 20, 1990

[30] Foreign Application Priority Data

Mar. 6, 1989 [FR] France .................. 89 02917

[51] Int. Cl.⁵ .................. B65B 31/00; B67C 3/00
[52] U.S. Cl. .................. 141/7; 141/168; 141/329; 222/5; 222/83
[58] Field of Search .................. 141/1, 7, 11, 51, 330, 141/325, 168, 329; 222/80, 83, 87, 88, 5, 83.5; 55/267, 385.4, 473; 128/200.23, 203.21; 277/227, 228

[56] References Cited

U.S. PATENT DOCUMENTS

| 3,828,976 | 8/1974 | Sidelinker | 222/835 |
| 4,166,481 | 9/1979 | Farris et al. | 141/1 |
| 4,349,054 | 9/1982 | Chipman et al. | 141/330 |
| 4,429,886 | 2/1984 | Buttner | 277/228 |
| 4,480,843 | 11/1984 | Springer | 277/228 |
| 4,690,180 | 9/1987 | Gold | 141/51 |
| 5,186,219 | 2/1993 | Gold et al. | 141/51 |

FOREIGN PATENT DOCUMENTS 0020040 10/1980 European Pat. Off. .

Primary Examiner—Henry J. Recla
Assistant Examiner—Steven O. Douglas
Attorney, Agent, or Firm—H. Jay Spiegel

[57] ABSTRACT

Method for destroying aerosol cans providing for their complete emptying, recovery, separation of various elements contained without losses, and the devices, automatic or not, for implementing the destruction method as well as the automatic piercing machine. The invention is related to the industrial sector of recovery and valorisation of waste products, the innovation of the method according to the invention allowing to pierce the aerosol can by means of a hollow needle (2) allowing to transfer the contents into a low pressure separation vat (8) making both housings, the aerosol can and the vat (8) to communicate, the invention using the resulting expansion in order to seperate the gases from the liquids, said gases thus expanded being sucked, compressed means of a compressor (13), liquified by an air-condenser (15) from where they are transferred into storage vats for treatment or reuse, the recovered liquids at the bottom of the vat (8) being transferred for reconditioning, treatment or destruction.

11 Claims, 3 Drawing Sheets

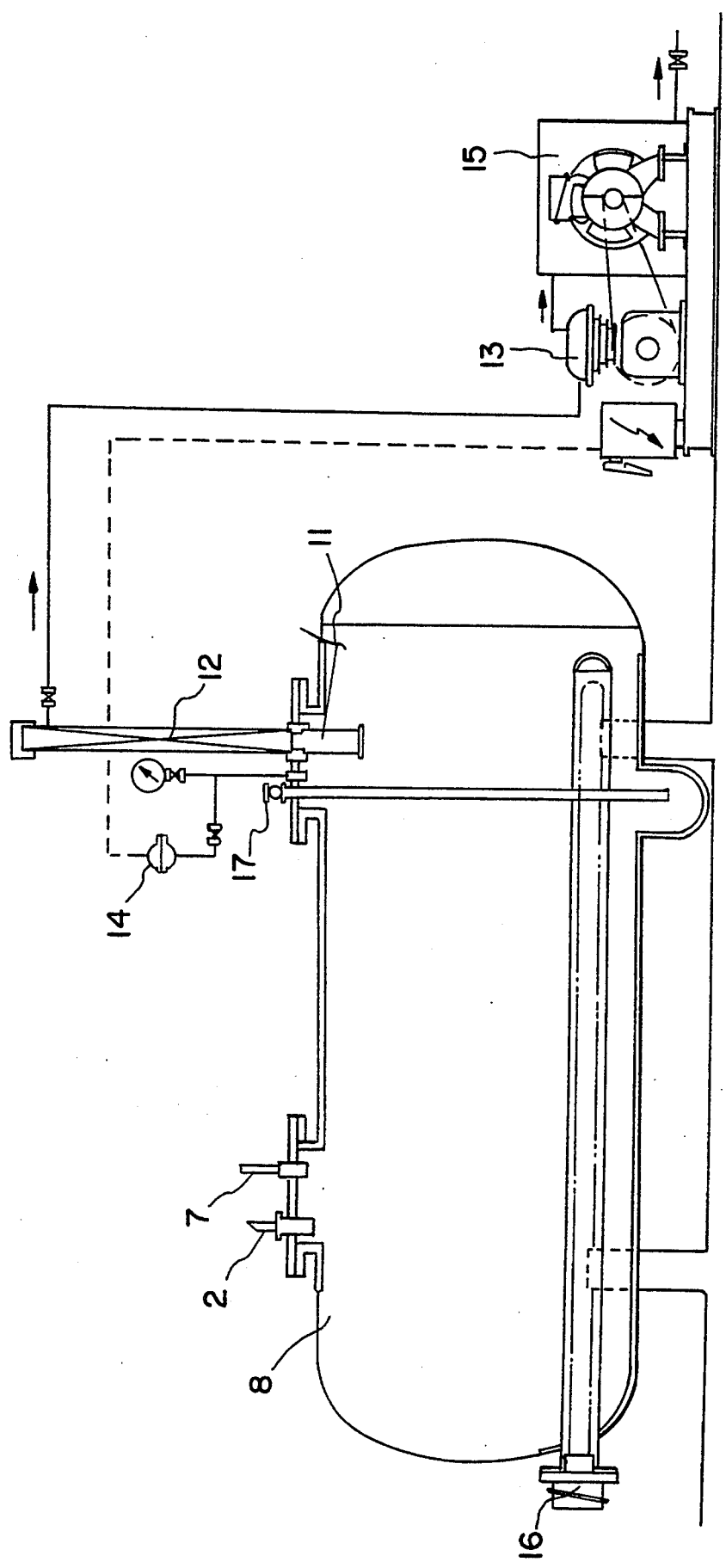

METHOD FOR DESTROYING AEROSOL CANS

Method for the destruction of aerosol cans, providing for their complete emptying, recovery and separation of the various contained elements without losses, and the devices, automatic or otherwise, for implementing the method of destruction, as well as the design principles of the automatic piercing machine.

The invention is related to the industrial sector of recovery and revaporization of waste products with, as principal object, the emptying of the aerosol cans, the recontainerizaiton of the contents, hazardous or not, without humain implication and without environmental pollution. Up to now, the principal techniques used for aerosol destruction have been by shredding without recovery of the propellant gas contents, such as CFC, liquefied petroleum gas, nitrogene, or carbon dioxyde ..., or by discharging into waste deposits, or by burying without any prior conditioning.

According to another aspect of the invention, the method of destruction permits, by means of a hollow needle, the piercing of the pressurisized aerosol cans, with or without cutting an operculum, the transferring of the contents of the aerosol cans into a low pressure tank, assuring the separation of propellant gases and liquids, restoring the various elements according to their original specifications.

According to another aspect of the invention, the method of destruction permits the recuperating of the empty aerosol cans without external staining by the initial contents.

According to another aspect of the invention, the method of destruction includes the necessary conveyor devices effecting the handling of the aerosol cans from the storage area to the feeding device of the piercing machine, automatic or not, as well as the systems for the extraction and handling of the aerosol cans after treatment.

To clearly define the object of the invention, without limiting it to the drawings.

FIG. 2 represents a sectional view illustrating the different devices necessary for implementing the destruction method.

The object of the invention is hereafter described, in a non-limitative manner, illustrated by the drawings. The method is described in parallel with the description of the invention.

Figure 1:
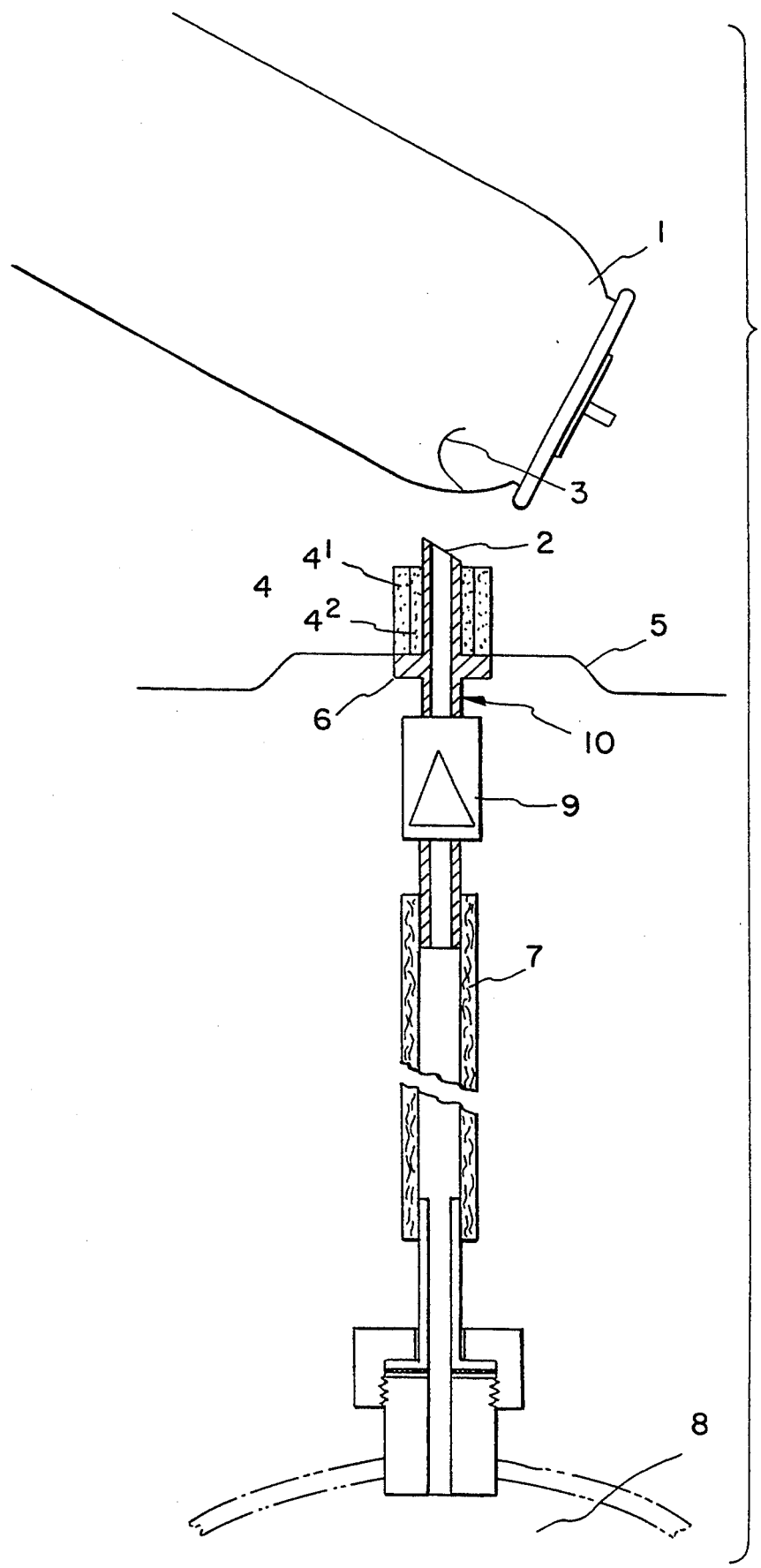
FIG. 1 represents a front sectional view illustratinng the principle of the transfer, by means of a hollow needle, of the aerosol contents.

FIG. 1. The aerosol can (1) is positionned in front of a needle having a hollow body (2), made of steel or any other suitable material, so that, by motion of the aerosol can, the needle, or both, the needle penetrates the aerosol can. The needle is beveled so that it penetrates the aerosol can, making a total or partial cut, with or without operculum, so that this operculum (3) does not obstruct the needle. A sealing device (4) is inserted between the aerosol can and the needle thus ensuring the tightness of the system during operation.

For example, the sealing device can be a packing composed of two rubber cylinders of differing resiliance, the hardest rubber cylinder encircling the softer one, the shape of said packing being adapted to suit the needle and the aerosol can.

As shown on FIG. 1 the aerosol can is maintained in a downward tilted position so as to obtain a low point in the puncturing area of the aerosol can (1). This arrangement ensures a satisfactory transfer of the contents. As this area is rigid, deformation of the can is limited during piercing. A film (5) can be inserted between the packing (4) and the shoulder (6) permitting collection of eventual droplets occurring in the final stage of the emptying process during the separation of the can and the needle. The shoulder (6) of the needle (2) is connected to the low pressure tank (8) by means of a flexible or rigid piping (7) allowing the transfer of the aerosol can contents. The piping (7) is equipped with a check valve (9) which eliminates leaks; and thereby any contact between the recuperated products and the atmosphere. Moreover, an orifice (10) situated betwen the shoulder (6) of the needle and the check valve (9) allows for an appropriate injection of a gas, which assures a purging of the space between the check valve and the atmosphere. A similar purging can also be achieved by a controlled leak of the check valve.

FIG. 2 illustrates an example, non limitative, of the different devices for the implementing of the destruction method. As described above (FIG. 1), the hollow needle (2) connected to the low pressure tank (8) allows the tranfer of the aerosol contents, i.e., propellant gases and liquid contents of the aerosol cans (1), into the low pressure tank (8).

One of the aspects of the invention resides in the fact that the decompression occurring during the interconnection of the two containers, which are at very different pressures, causes flashing and therefore separation of the two components of the gas/liquid mixtures. The resulting vapors are sucked through a strainer (11) and a drop-guard column or Rachig ring (12) by means of a compressor (13) controlled by a pressostat (14) located in the low pressure tank (8), then compressed and reliquefied by an air condenser (15) in accordance with the pressure and temperature conditions of the gases concerned. The said liquefied gases are thereafter transferred into suitable storage tanks (31) not shown on FIG. 2. The recuperated liquid in the bottom of the low pressure tank (8), which could contain dissolved gases, is reheated by means of a heat exchanger (16); the resulting vapors are recycled by the compressor (13) as described above. After degasification, the liquids are transferred through the piping (17) for reconditioning, for re-use, for ulterior treatment, or for destruction.

Figure 3B:
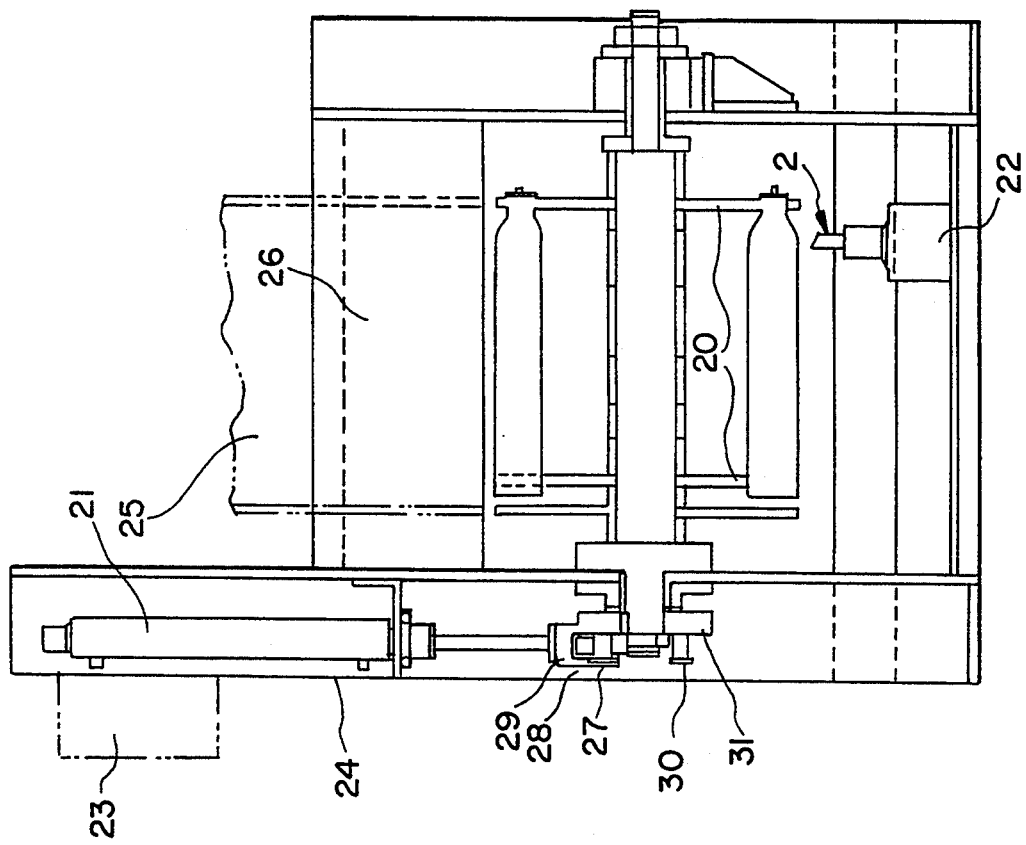
FIG. 3B is an elevation of the automatic piercing machine.
Figure 3A:
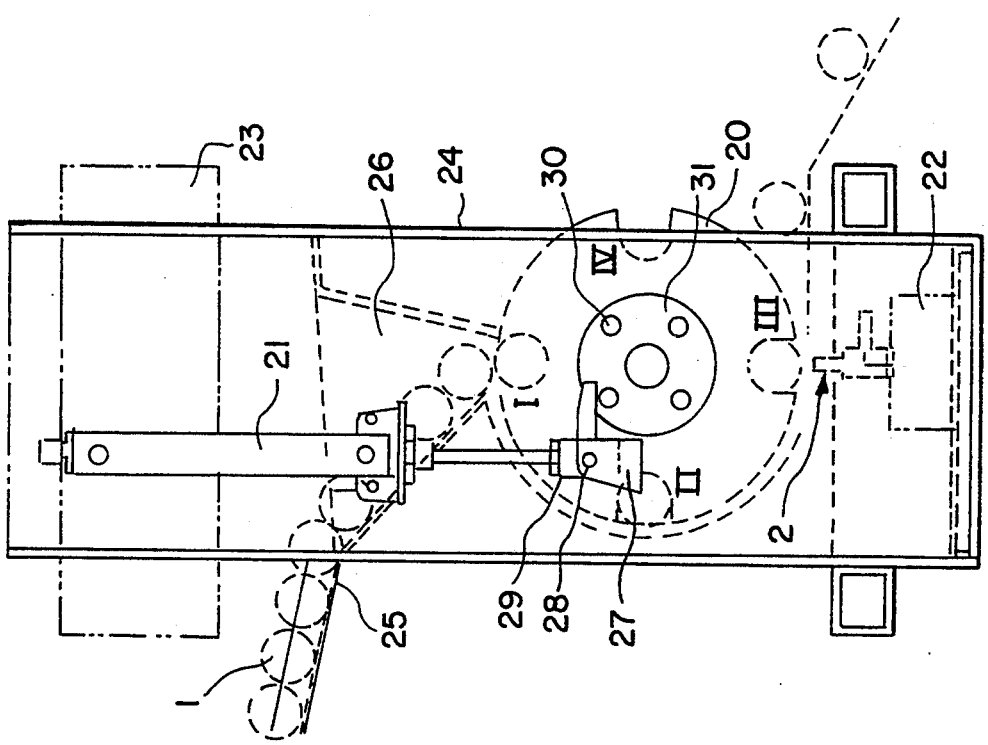
FIG. 3A is a front view.

Another aspect of the invention is to define and automatic piercing machine as illustrated by FIGS. 3A and 3B. This is mentioned only as an example, and not as a limitation of the scope of the invention.

The piercing machine is principally composed of a revolving drum (20) provided with four lodgings for the aerosol cans (1), a pneumatic actuator (21) activating the rotation of the drum (20), another pneumatic actuator (22) equipped with a hollow needle (2), already described (FIG. 1), and pneumatic sequencing equipment (23) providing the synchronization of the actuating devices (21) and (22), as well as the necessary timing adjustment devices. The whole assembly is installed on a rigid frame (24).

The aerosol cans deposited on feeding means including a tilted ramp (25) permitting introduction into a feed hopper (26). Inclined on a horizontal axis, the revolving drum is equipped with four recesses or lodgings, adapted to suit the aerosol cans, which are positioned by means of the pneumatic actuator (21), acting in a vertical plane, and by means of a finger (27) rotating on the pin (28) supported by the clevis member (29) which is fitted on the pneumatic actuator rod (21). The rotation of the revolving drum (20) is obtained by the downward thrust of the finger (27) on one of the four pins (30) positioned equidistant on the coupling disc (31) fitted to the revolving drum (20). The rotary movement, by successive quarter turns, thus positions the aerosol can as follows and sequences: position I: feed; position II: intermediate; position III: piercing, during which the can is pierced by means of the hollow needle (2) actioned by the pneumatic actuator (22) in a vertical plane, piercing the shell of the can and thus permitting the emptying and the transfer of the contents, gases and liquids, through the hollow needle as previouly described above (FIG. 1). The movement of the actuators (21) and (22) is controlled by a pneumatic control and regulation unit (23) which allows their proper sequencing and timing, according to the time required emptying each aerosol can. At the final stage of the piercing operation; the the actuator (22) retracts; thus withdrawing the hollow needle from the aerosol can and permitting the following quarter turn of the revolving drum (20). A further quarter turn provokes simultainously: the extraction of the emptied aerosol can (between the positions III and IV), the admission (in position III) of the following aerosol can, and the discharge into the feed hopper (26) of the succeeding aerosol can.

According to the destruction process, it is obvious that without leaving the described inventive scope, other alterations could be made to the machine without a change in operation.

The invention does not absolutely limit itself neither in application or realization to the various parts which have been specifically disclosed, but on the contrary, it covers all possible alternatives.

We claim:

1. Method for destroying aerosol cans including the steps of:
    a) providing a machine including feeding means for feeding aerosol cans into a rotary drum having at least one recess sized to receive an aerosol can, said at least one recess being alignable with said feeding means in one position of said drum and said at least one recess being rotatably movable to a second position in alignment with a reciprocable needle having a hollow body and a sealing device surrounding said hollow body for sealing around a can opening to be formed in said aerosol can be said needle;
    b) rotating said drum to said first position of said at least one recess and causing said at least one recess to receive an aerosol can;
    c) rotating said drum to said second position of said at least one recess;
    d) reciprocating said needle to pierce through said aerosol can to form said can opening while concurrently sealing about said can opening with said sealing device;
    e) draining all fluid from said aerosol can;
    f) withdrawing said needle from said can opening; and
    g) rotating said drum to a position where said aerosol can is discarded.

2. The method of claim 1, further including the step of forming said sealing device of a first inner cylinder of relatively soft resilience surrounded by a second outer cylinder of relatively harder resilience.

3. The method of claim 2, further including the step of providing said needle with a shoulder proximal of said sealing device.

4. The method of claim 1, further including the steps of:
    a) fluidly connecting said needle with a check valve and a low pressure tank;
    b) fluidly connecting said tank with a passageway including a strainer followed by a column connected via a conduit to a low pressure inlet of a compressor having a high pressure outlet connected to an air condenser;
    c) actuating said compressor responsive to sensed pressure in said low pressure tank; and
    d) feeding gases extracted from aerosol cans through said strainer, column, conduit, compressor and condenser and thence to a storage tank.

5. The method of claim 4, further including the steps of:
    a) degassifying liquid in said low pressure tank; and
    b) removing said degassified liquids from said low pressure tank.

6. The method of claim 4, further including the step of providing said needle with a purging orifice for purging a space in said needle between said check valve and said purging orifice.

7. The method of claim 1, further including the step of providing said needle with a shoulder proximal of said sealing device.

8. The method of claim 1, further including the step of making said needle of steel.

9. The method of claim 1, wherein said at least one recess comprises four recesses equidistantly spaced about a circumference of said drum.

10. The method of claim 1, wherein said reciprocating step comprises reciprocating said needle with a pneumatic actuator.

11. The method of claim 1, wherein said feeding means includes a feed hopper.

* * * * *